Figure 8:
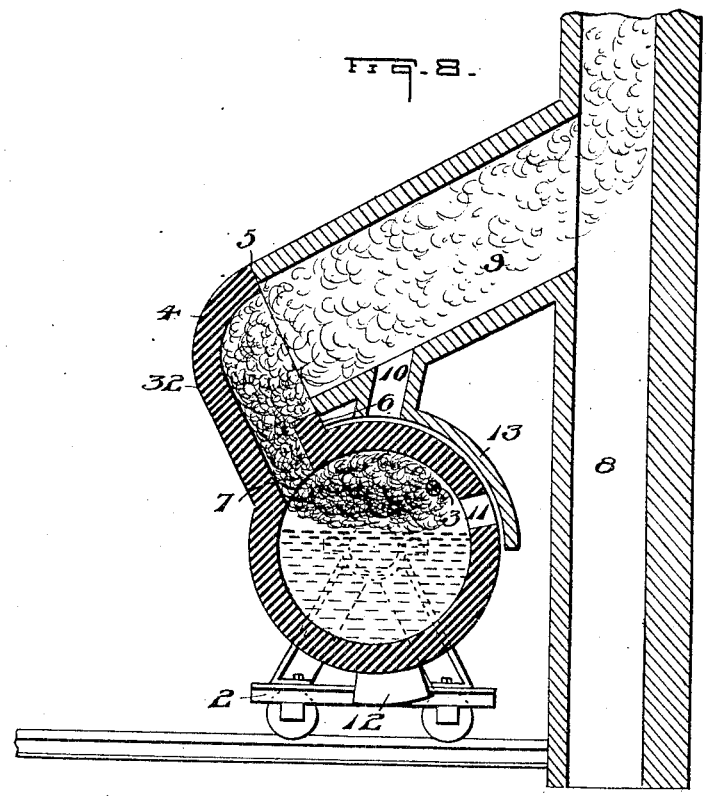

No. 852,396. PATENTED APR. 30, 1907.
R. S. PEASE.
APPARATUS FOR MAKING GLASS.
APPLICATION FILED OCT. 19, 1904.
3 SHEETS—SHEET 1.
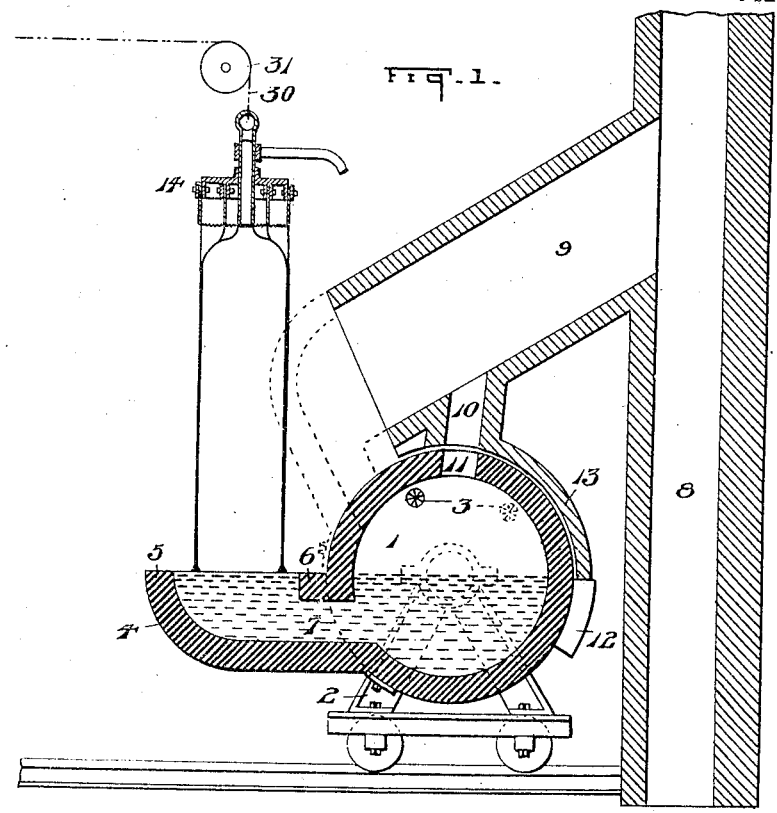
Fig. 1.
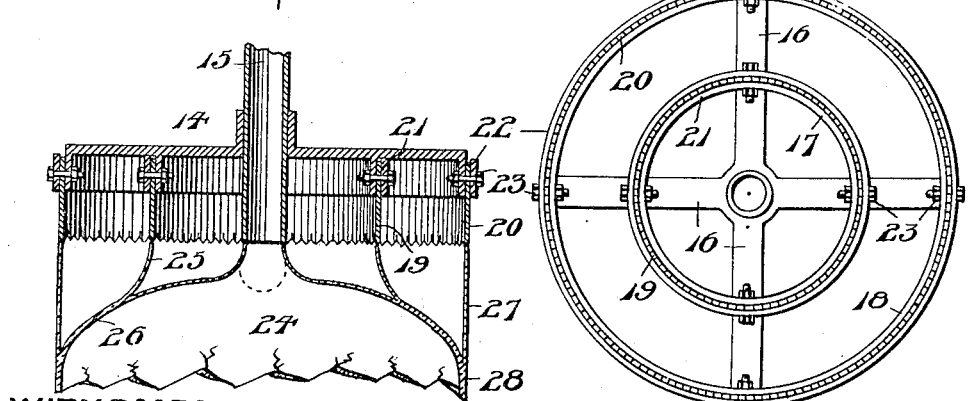
Fig. 2. Fig. 3.
WITNESSES:
INVENTOR
R. S. Pease
by
Wm L. Pierce
his ATTORNEY No. 852,396. PATENTED APR. 30, 1907.
R. S. PEASE.
APPARATUS FOR MAKING GLASS.
APPLICATION FILED OCT. 19, 1904.
3 SHEETS—SHEET 2.
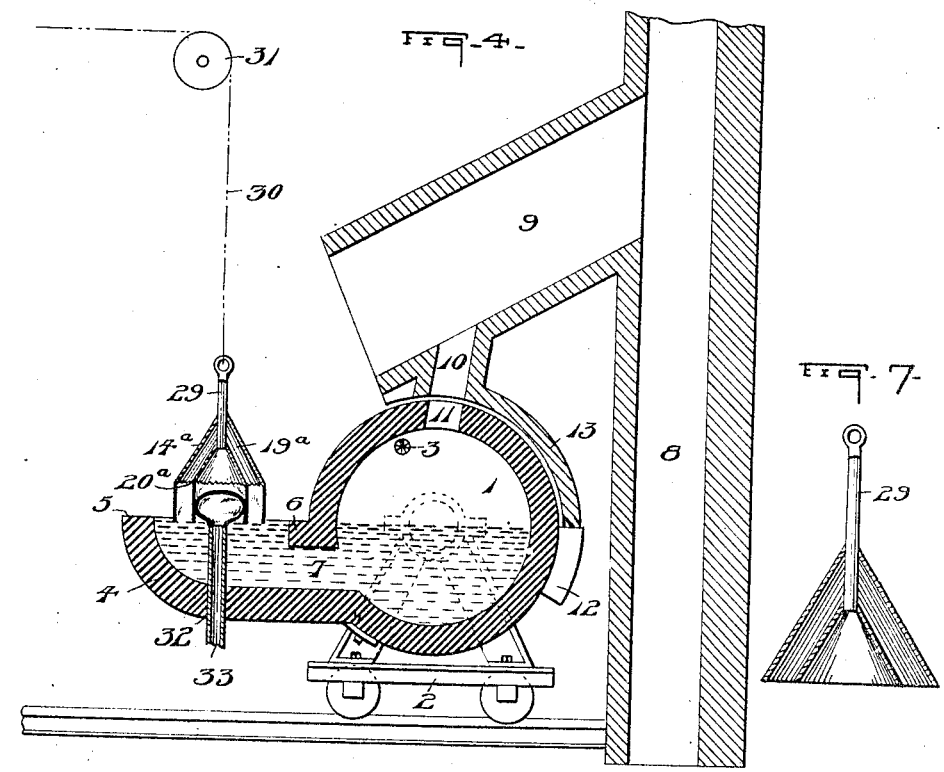
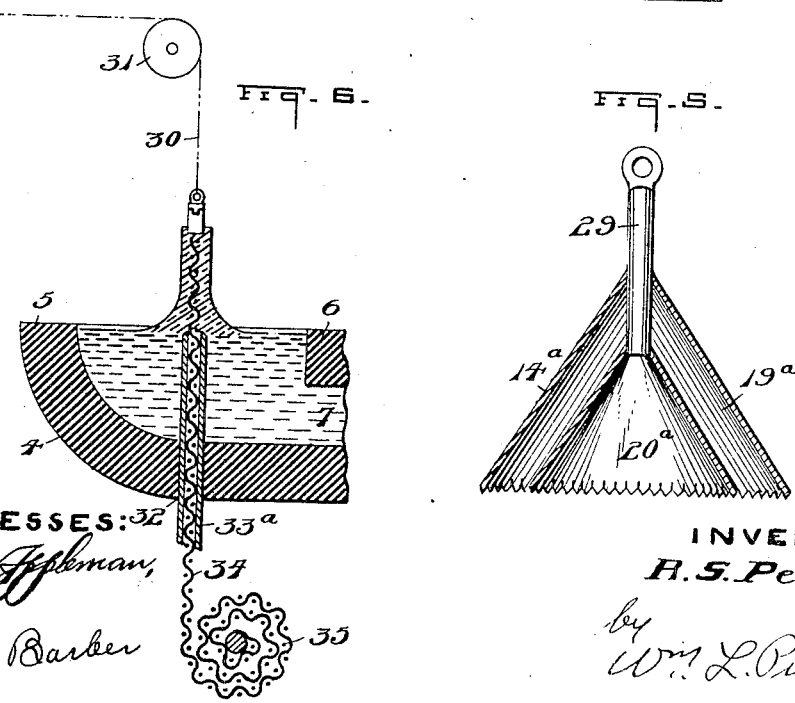
WITNESSES:
J. P. Appleman
F. N. Barber
INVENTOR
R. S. Pease
by
Wm. L. Pierce
ATTORNEY No. 852,396. PATENTED APR. 30, 1907.
R. S. PEASE.
APPARATUS FOR MAKING GLASS.
APPLICATION FILED OCT. 19, 1904.

3 SHEETS—SHEET 3.

WITNESSES:
J. P. Appleman,
F. N. Barber

INVENTOR
R. S. Pease
by
Wm L. Pierce
his ATTORNEY

UNITED STATES PATENT OFFICE.

ROGER S. PEASE, OF ALLEGHENY, PENNSYLVANIA.

APPARATUS FOR MAKING GLASS.

No. 852,396.  Specification of Letters Patent.  Patented April 30, 1907.

Application filed October 19, 1904. Serial No. 229,085.

*To all whom it may concern:*

Be it known that I, ROGER S. PEASE, a citizen of the United States, residing at Allegheny, in the county of Allegheny and State of Pennsylvania, have invented or discovered new and useful Improvements in Apparatus for Making Glass, of which the following is a specification.

My invention relates to apparatus for drawing sheets or cylinders of glass from a molten bath, and its object is to provide a novel pot in which the glass is poured and kept hot during the drawing operation, and which is provided with a heating means to keep the glass hot during the operation, and also to reheat after the drawing operation the portion thereof from which the glass has been drawn.

My invention relates also to the combination of the pot and means whereby the glass is drawn therefrom.

Figure 9:
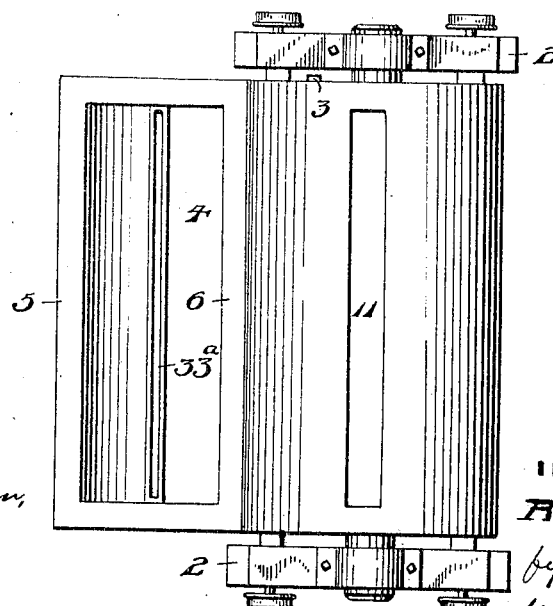

Referring to the drawings which form a part of this specification, Figure 1 is a vertical section of my invention taken transversely through the pot and showing a cylinder in the process of being drawn; Fig. 2 is a vertical central section of one form of a bait which I prefer to employ; Fig. 3 is an underplan view of the same; Fig. 4 is a vertical section showing a modified form of bait and pot; Fig. 5 is an enlarged vertical section of the bait shown in Fig. 4; Fig. 6 is a fragmentary view showing how my invention may be used to make wire-glass; Fig. 7 is a vertical section of a drawing tool with its lower end plain or unbroken in outline. Fig. 8 is a vertical section similar to Fig. 1 showing the pot rotated so as to reheat the trough portion thereof and Fig. 9 is a plan of the complete pot shown in Fig. 6.

Referring now to Fig. 1, 1 represents a cylindrical pot mounted axially on the car 2. 3 represents a gas burner situated at the upper part of the interior of the pot by which the glass is melted during the drawing operation and the trough portion of the pot reheated after the drawing operation. Connected to one side of the pot is the trough 4 having the outer lip 5 and the inner lip 6 between which lies the surface of the glass from which the drawing is made. The upper surface of these lips lies slightly above the upper wall or lip of the passage 7 which conveys the melted glass from the cylindrical portion of the pot into the trough. The glass should be of a sufficient depth in the trough to keep the drawing surface at the proper temperature. 8 represents a chimney having a lateral flue 9 extending over the pot. The lower end of this flue 9 is open and is adapted to register with the mouth of the trough 4 when the pot is rotated into the position shown by the dotted lines, in which position the passage 7 and the trough furnish a path for the escape of the products of combustion from the burner 3, the burner serving at the same time to reheat the trough and melt out any glass adhering thereto. The flue 9 is provided with a branch flue 10, which registers with the passage 11 in the upper side of the pot 1 in its normal or drawing position. During the drawing operation the products of combustion from the burner 3 escape through the passage 11 and the flues 9 and 10 into the chimney 8. 12 designates a stop-lug secured to the pot 1, the lug engaging with the lower side of the wall 13 when the pot has been rotated down into the position for drawing glass as shown.

Referring now to all the figures on Sheet 1 of the drawings: 14 designates the drawing tool or bait by which the glass is raised from the pot and made into cylindrical form. The bait is provided with a central vertical tube 15 which forms a portion thereof, and by which the other portions are supported. To the tube 15 are secured the arms 16 provided on their under side with flanges 17 and 18 concentric with the tube. Sleeved upon these flanges 17 and 18 are the skirts 19 and 20 which are clamped between the flanges and the bands 21 and 22 by means of the bolts 23. The lower ends of the tube 15 and the skirts 19 and 20 are in substantially the same horizontal plane. The skirts are provided with notched lower edges in order to present separated points for the attachment of the glass. Although I have shown the skirts notched, they may be of any suitable construction which will present a series of separated points to the glass and I do not limit myself to the continuous band in the construction of the skirts, as they may be made wholly of separated parts serially arranged or of one or more parts presenting the required attaching points of the glass. I do not limit the word skirt to any usual use or idea of the term, but desire to include any endless series of points or separated surfaces for the attachment of the glass, whether these points or surfaces are wholly distinct or separated from each other, or secured to or integral with a common support. The tube 15 would preferably be composed of a composition whose coefficient of expansion is the same as that of the glass in order to prevent the glass cracking around it during its cooling.

Supposing the pot to be filled with glass at the level shown in Fig. 1, the bait is lowered into the glass and the latter allowed to become attached thereto in the usual manner. The bait is then raised and air blown in through the tube 15. At the beginning of this operation the blowing will form a small bubble as indicated by the dotted line 24. If it were now required to make a cylinder from this preliminary bubble, it is clear that the glass of which the bubble is composed must be stretched and therefore its wall thinned in order to obtain the required diameter of the cylinder. Where the cylinder is of considerable diameter the shoulder where the cylinder begins is necessarily very thin and in practically all cases the cylinder will be thinner at this point than it is desired to have it. It is an impossibility to increase the thickness of the cylinder wall after the cylinder proper has been started. My improved bait overcomes this objectionable thinning of the cylinder wall in the following manner:—After the preliminary bubble 24 has been expanded so as to become materially thinned it comes in contact with the depending skirt of glass 25 attached to the bait skirt 19, the original bubble wall and the skirt 25 merging into a reinforced skirt 26 becomes stretched and thinned and finally comes into contact with the skirt of glass 27 hanging to the skirt 20, the two skirts 26 and 27 forming a new reinforced skirt 28 which I have shown to be the starting place of the cylinder proper. The tube 15 may be regarded also, as a skirt. I have shown the air admitted through the bait, but I do not limit myself to this construction since it is immaterial to the broad idea of my invention whether the air is introduced through the bait or through the glass in the pot after the manner well known in the art. When the drawing has been completed the cylinder is cut off from any glass remaining in the pot and the pot rotated to the position shown in the dotted lines in Fig. 1. The burner 3 which has been keeping the glass hot during the drawing operation and sending its gases through the passage 11 and the flues 9 and 10 now finds its exit through the passage 7 and the trough 4 into the flue 9, whereby the glass sticking in the trough is remelted and the trough reheated and the cylindrical portion of the pot kept hot ready for another supply of glass. When the pot has become sufficiently heated and prepared for the reception of another supply of glass it is rotated to the position shown in full lines in Fig. 1 and recharged with molten glass, another cylinder being drawn in the manner described.

Referring now to Figs. 4 and 5, the bait or drawing tool 14$^a$ is shown as composed of two concentric cones or skirts 19$^a$ and 20$^a$ secured together by the rod 29. The bait may be raised and lowered by the cord 30 and the pulley 31, which are also used in the form of invention shown in Fig. 1, but any other approved form of raising and lowering means may be used. The rod 29 is shown solid but it may be hollow as in Fig. 1 when used with the pot shown thereon.

In Fig. 4 the pot 1 has an opening 32 in its bottom beneath the space between the lips 5 and 6. In this opening is the tube 33 which may be used to blow air or its equivalent into the interior of the cylinders as they are drawn, or which may, when its upper end is adjusted so as to be below the surface of the glass, be employed to form a preliminary bubble to be seized by a clamp or other drawing device or to be expanded so as to merge with the glass skirt depending from the bait skirt 19$^a$. If the preliminary bubble be not formed, and the skirts do not have spaced points the bait will be raised from the trough with two glass skirts or bodies depending from it, and upon forcing air up through the tube 33 the inner glass skirt will be expanded till it merges with and reinforces the outer glass skirt in a manner readily understood. The tube 33 may be raised and lowered, as occasion requires, by any suitable means. It is evident that the bait shown in Figs. 4 and 5 could be used with the pot shown on Fig. 1, if the same were provided with a means of introducing air as by making the rod 29 hollow or by leading a tube through the skirts 19$^a$ and 20$^a$.

Referring now to Fig. 6, the pot is similar to that of Fig. 4. In the former, the tube is employed as a guide for the wire trellis or fabric 34, stored in a roll 35 or otherwise. The glass covers the top of the tube 33$^a$ and as the fabric is drawn upward the glass adheres to both sides of the same and forms a sheet of glass with the wire located at the center of the sheet. The tube or guide 33$^a$ will prevent the fabric from warping. This method of making wire glass may be used with continuous tanks, when the tube 33$^a$ would remain practically stationary, or it may be used with pots which have to be refilled, when the tubes will be lowered in any suitable manner so as to keep the top thereof below the surface of the glass.

As to Figs. 1, 2, and 4 it may be remarked that the number of skirts is immaterial. It is clear that with the central one omitted the inner skirt 25 could be expanded so as to meet the skirt 27, provided the skirt 19 had no teeth.

As to Fig. 4 it may be said that the pot shown therein may be used with various forms of drawing tools; whether with a single skirt or a plurality of skirts.

It will be seen that my invention is not limited to the drawing of cylinders, as sheets or other forms may also be drawn from the pot.

I do not limit myself to the precise details of construction and practice above described but desire to include within my invention all modifications which come within the scope thereof.

Having described my invention, I claim:—

1. In an apparatus for forming glass, an inclosed rotary pot, a burner for internally heating the same and a flue for conveying away the products of combustion the pot having communication with the flue by separate orifices therein when the pot is in both its normal and its rotated positions.

2. In an apparatus for forming glass, an inclosed pot having an extension with an open top, a burner for internally heating the same, an off-take for removing the products of combustion, said pot having normally connection with said off-take, and means for bringing the mouth of the extension into connection with the off-take whereby the extension may be reheated.

3. In an apparatus for containing and delivering molten glass, the combination with a stationary flue, of a rotatable glass-containing pot having a lateral open-top extension arranged for drawing position or gas circulation position with respect to said flue respectively, and means for supplying fuel to the interior of the pot in either position, substantially as set forth.

4. In an apparatus for forming glass, a rotatable pot having an inclosed portion provided with a burner and another portion opening upwardly whence glass may be drawn, and a passage between such portions whereby the burner may, upon rotation of the pot, melt out the glass in the second portion and reheat the same.

5. In an apparatus for forming glass, a rotatable pot, a metal fabric guide tube extending up through the bottom thereof, and means for drawing upwardly the fabric and attached glass.

6. In an apparatus for containing and delivering molten glass, the combination with a stationary flue, of a rotatable glass-containing pot having a lateral open-top extension arranged for drawing position or gas circulation position with respect to said flue respectively, means for supplying fuel to the interior of the pot in either position, with means for positively arresting movement of the pot in its lowered position, substantially as set forth.

7. In an apparatus for containing and delivering molten glass, the combination with a stationary flue having two independent gas circulation inlet orifices, of a rotatable glass-containing pot provided with a gas outlet orifice arranged to communicate with one of said flue orifices in drawing position, and a lateral drawing extension arranged to be located in drawing position and to communicate with the other circulation orifice of the flue when the pot is tilted upwardly, substantially as set forth.

Signed at Pittsburg, this 13th day of Oct., 1904.

ROGER S. PEASE.

Witnesses:
F. N. BARBER,
A. M. STEEN